Patented Aug. 22, 1933

1,923,704

UNITED STATES PATENT OFFICE 1,923,704

VISCOSITY REDUCED COATING COMPOSITION

Theodore F. Bradley, Westfield, N. J., assignor to Ellis-Foster Company, Montclair, N. J., a Corporation of New Jersey No Drawing. Application May 6, 1927
Serial No. 189,456

8 Claims. (Cl. 134—26)

This invention relates to coating compositions of reduced viscosity and relates particularly to compositions suitable for application to various surfaces by means of an ordinary paint brush. The invention is not, however, limited to brushing compositions, since compositions made according to this invention are also improved for application by spraying, flowing or dipping methods.

A particular feature of this invention relates to compositions of minimum viscosity which are secured through the use of ternary solvent mixtures comprising a nitrocellulose solvent, hydrocarbon diluent, and an alcohol of viscosity reducing nature.

In the preferred form of this invention nitrocellulose is dissolved and incorporated with a synthetic resin having greater toughness and durability than rosin ester, dammar, and other such resins as are now commonly used in nitrocellulose lacquers. Synthetic resins of such nature have been produced, but have been found to yield solutions of greater viscosity than other less durable resins. It is believed that the molecular and colloidal structure of such resins which are responsible for their exceptional toughness and durability, are also responsible for the relatively viscous solutions produced. Thus, relative viscosity of resin solutions may in a measure indicate the toughness and durability of the resin itself.

As low viscosity of a coating solution is desirable, and in many cases necessary for proper application, the low viscosity is ordinarily obtained by dilution with volatile solvents. The amount of solvent required to attain any definite viscosity will vary with several factors, but chiefly according to the molecular and colloidal structure of the dissolved material or solute, and with the chemical nature of the solvent employed. Owing to the identic relationship of toughness and durability with relatively high viscosity, it has been more desirable in many cases to alter the amount and nature of the solvent, rather than the chemical and colloidal nature of the solute. This has been the object of the present invention, which will perhaps be better understood by the following example.

A synthetic resin having much greater toughness and durability to weathering influences than may be obtained from rosin ester, dammar, and the like, may be prepared as follows:—

| | Parts by weight |
|---|---|
| Phthalic anhydride | 80 |
| Distilled fatty acids from cottonseed oil | 45 |
| Glycerol (98 per cent) | 50 |

The above reaction mixture is heated in a partially closed aluminum kettle, or other suitable container, preferably using mechanical agitation. The temperature is carried to a temperature of approximately 450° F., and maintained at such temperature until the resin shows an acid number of not substanially more than 25. The acid number may be lowered somewhat by heating the resin in vacuo. For example, after the resin has been made in the manner indicated, it may be advantageous to then apply a vacuum and continue the reaction under full vacuum. In order to avoid polymerization, it is best to lower the temperature to approximately 375° F. during the vacuum treatment. The vacuum treatment has been observed to slightly lower the acid number, so that resins having an acid number lower than 20 may be obtained. It has also been observed to harden the material slightly and to have some influence on improving the water resistance of the resin. A resin of this general character has been found to not only have great toughness and durability, but blends well with nitrocellulose in any proportion. As indicated, the toughness and durability is also somewhat counterbalanced by relatively high viscosity in solution. In order to utilize this material in the most satisfactory manner, it has been found advantageous to utilize certain solvent mixtures of viscosity reducing nature.

A very durable brushing lacquer, for example, may be made as follows:—

| | Parts by weight |
|---|---|
| Synthetic resin (made from phthalic anhydride, glycerol and cottonseed oil fatty acids) | 20 |
| One-half second viscosity nitrocellulose | 5 |
| Dibutyl phthalate | 5 |
| Secondary butyl acetate | 35 |
| Secondary butyl alcohol | 15 |
| Toluol | 20 |

When colors are to be employed approximately 20 parts by weight of a pigment such as zinc oxide, may be added to the foregoing. The pigment is preferably ground with this mixture in a ball mill, or may be ground in the plasticizer and the resin solution on an ordinary stone paint mill.

In the above formula the secondary butyl alcohol has been found to produce a marked lowering of viscosity over a similar solution made with only the acetate solvent and toluol diluent. The alcohol thus serves in admixture with the ester and hydrocarbon as a valuable viscosity reducing material, and this is accomplished without affecting the toughness and durability of the synthetic resin contained therein. Such a lacquer has been found to give very much more durable films on wood surfaces, as well as metal, and to be particularly resistant to sunlight, exterior weathering influences, etc., yielding coatings which have in some cases been found to be more than twice as durable as other lacquers made with ordinary resins. It is thus observed that the alcohol is a very valuable addition. Isopropyl alcohol has also been found particularly suitable for reducing viscosity and may be substituted in the previous formula for secondary butyl alcohol. It has been observed that isopropyl acetate is often a valuable ingredient, although not a viscosity reducing substance, its value appears to lie in the fact that it has less softening action on under coats than, for example, ethyl acetate. Isopropyl acetate and isopropyl alcohol with benzol may form a vehicle suitable for spray lacquers, and although of quite volatile nature, the influence of high resin content, together with the viscosity reducing nature of the alcohol, will permit of satisfactory application by means of a spray gun.

A spraying lacquer, for example, may comprise:

| | Parts by weight |
|---|---|
| Castor oil phthalic glyceride resin | 10 |
| One-half second viscosity nitrocellulose | 5 |
| Tricresyl phosphate | 3 |
| Titanium oxide | 14 |
| Isopropyl acetate | 30 |
| Isopropyl alcohol | 15 |
| Toluol | 25 |

The castor oil phthalic glyceride resin as employed in the above formula is not equivalent to the resin made from cottonseed oil fatty acids, phthalic anhydride and glycerine, being of somewhat softer and more plastic nature, and not as soluble in many nitrocellulose solvents, nor as tolerant of hydrocarbons as the former resin. Owing to its very light color and durability it offers certain desirable advantages. Such a resin may be made, for example, by heating a mixture of 40 parts castor oil with 80 parts phthalic anhydride and 48 parts of 98 per cent glycerol to a temperature of approximately 460° F. holding at that temperature until an acid number of less than 20 has been obtained.

The lacquer mixture may be ground in a ball mill, or by other ordinary procedures.

Various alcohols may be employed in order to secure this desirable effect, although secondary alcohols such as are obtained from petroleum are preferred for the purposes of this invention.

This invention is not limited to any particular synthetic resin, it being applicable to any synthetic resin which is more tough and durable than rosin ester and yielding high viscosity solutions. Among such resins are a number having otherwise very diverse characteristics, such as Albertol or modified phenol formaldehyde resins, various condensation products of phthalic anhydride, or other polyhydric basic acids with polyhydric alcohols, or their equivalents.

Various types of nitrocellulose may be employed. Since high viscosity nitrocellulose ordinarily is very much tougher and stronger than the low viscosity forms, it is in many cases advantageous to employ the high viscosity nitrocellulose, and in such cases the employment of such viscosity minimizing solvent mixtures are perhaps even more highly advantageous, permitting the application of solutions containing a greater amount of dissolved substance and producing a heavier and thicker film.

What I claim is:

1. A coating composition containing nitrocellulose and a synthetic resin which normally yields solutions of greater viscosity than rosin ester, maintained in solution by a solvent mixture comprising a nitrocellulose solvent, a hydrocarbon diluent and secondary butyl alcohol.

2. A solvent mixture for use in coating compositions containing nitrocellulose and a synthetic resin, which comprises a nitrocellulose solvent, a hydrocarbon diluent, and secondary butyl alcohol.

3. A coating composition containing nitrocellulose and a synthetic resin which normally yields solutions of greater viscosity than rosin ester, maintained in solution by a solvent mixture comprising a nitrocellulose solvent, a hydrocarbon diluent and a viscosity reducing alcohol selected from a group including secondary butyl alcohol and isopropyl alcohol.

4. A coating composition containing nitrocelluose, a synthetic resin, and a solvent that yields a normally viscous solution with the nitrocellulose and resin, and a viscosity reducing alcohol selected from a group including secondary butyl alcohol and isopropyl alcohol.

5. A coating composition comprising nitrocellulose, a phthalic anhydride glycerol cottonseed oil fatty acids synthetic resin, secondary butyl acetate, secondary butyl alcohol, and toluol.

6. A coating composition comprising nitrocellulose, castor oil phthalic glyceride resin, isopropyl acetate, isopropyl alcohol, and toluol.

7. A coating composition containing nitrocellulose, a cottonseed oil fatty acids phthalic glycerol resin, secondary butyl acetate, secondary butyl alcohol, toluol, and dibutyl phthalate.

8. A coating composition comprising nitrocellulose, castor oil phthalic glyceride resin, tricresyl phosphate, isopropyl acetate, isopropyl alcohol, and toluol.

THEODORE F. BRADLEY.